(12) United States Patent
Mager et al.

(10) Patent No.: US 6,613,441 B2
(45) Date of Patent: Sep. 2, 2003

(54) BORON- AND/OR ALUMINUM-CONTAINING MIXTURES, HYBRID MATERIALS, AND COATINGS

(75) Inventors: Michael Mager, Leverkusen (DE); Steffen Hofacker, Euskirchen (DE)

(73) Assignee: Bayer Aktiengesellschaft, Leverkusen (DE)

( * ) Notice: Subject to any disclaimer, the term of this patent is extended or adjusted under 35 U.S.C. 154(b) by 10 days.

(21) Appl. No.: 10/000,573

(22) Filed: Oct. 23, 2001

(65) Prior Publication Data

US 2002/0068793 A1 Jun. 6, 2002

Related U.S. Application Data

(63) Continuation of application No. 09/275,659, filed on Mar. 24, 1999, now Pat. No. 6,395,826.

(30) Foreign Application Priority Data

Mar. 30, 1998 (DE) .......................................... 198 14 060

(51) Int. Cl.⁷ .................. B32B 25/20; C08L 83/06; C08G 79/01; C08G 77/22; C07F 7/02
(52) U.S. Cl. .................. 428/447; 524/779; 524/780; 524/783; 524/860; 524/863; 524/858; 524/837; 528/26; 528/33; 528/35; 528/37; 528/394; 528/395; 356/8; 356/9; 356/10; 356/27; 356/431; 356/434; 356/450; 556/460; 556/465
(58) Field of Search .................. 524/779, 780, 524/783, 860, 858, 863, 837; 528/26, 33, 35, 37, 394, 395; 556/8, 9, 10, 27, 431, 434, 450, 460, 465; 428/447

(56) References Cited

U.S. PATENT DOCUMENTS

| | | | |
|---|---|---|---|
| 5,378,790 A | 1/1995 | Michalczyk et al. | 528/35 |
| 5,548,051 A | 8/1996 | Michalczyk et al. | 528/15 |
| 5,677,410 A | 10/1997 | Mager et al. | 528/15 |
| 5,962,713 A * | 10/1999 | Kraus et al. | 556/10 |
| 6,395,826 B1 * | 5/2002 | Mager et al. | 524/858 |

FOREIGN PATENT DOCUMENTS

| | | |
|---|---|---|
| DE | 196 03 241 | 7/1997 |
| DE | 196 50 147 | 6/1998 |
| WO | 98/38251 | 9/1998 |

* cited by examiner

*Primary Examiner*—Robert Dawson
*Assistant Examiner*—Jeffrey B. Robertson
(74) *Attorney, Agent, or Firm*—Joseph C. Gil; John E. Mrozinski, Jr.

(57) ABSTRACT

The present invention relates to mixtures prepared from

(A) at least one linear, branched, or cyclic monomeric organosilane having at least two silicon atoms with hydrolyzable and/or condensation-crosslinking groups in which the silicon atoms are bonded to one another through at least one carbon atom in a linking unit, and (B) at least one boron- and/or aluminum-containing compound having the formula (I)

$$R_xM(OR')_{3-x} \qquad (I)$$

wherein
M is Al or B,
x is 0, 1, or 2,
R is $C_1$–$C_6$-alkyl, $C_6$–$C_{12}$-aryl, or $(O)_{1/2}$, with the proviso that if R is $(O)_{1/2}$, then the compound of the formula (I) is a chain when x is 1 and a cyclic or cage-form compound when x is 2, and
each R' is independently H, $C_1$–$C_{10}$-alkyl, or $C_6$–$C_{12}$-aryl. The invention further relates to hybrid materials prepared from such mixtures and to coatings produced therefrom.

11 Claims, 3 Drawing Sheets

BORON- AND/OR ALUMINUM-CONTAINING MIXTURES, HYBRID MATERIALS, AND COATINGS

This application is a continuation of application Ser. No. 09/275,659, filed on Mar. 24, 1999 now U.S. Pat. No. 6,395,826.

BACKGROUND OF THE INVENTION

The present invention relates to boron- and/or aluminum-containing, silicon-containing mixtures and hybrid materials and coatings produced therefrom.

German Patent Applications DE-A 19,603,242 and DE-A 19,603,241 and PCT Application WO 94/06807 describe numerous organosilanes from which inorganic-organic hybrid materials can be prepared via a sol-gel process. These materials can be employed, for example, for coating surfaces. The coatings, which can be cured at room temperature, are distinguished, for example, by a high transparency, good resistance to solvents, and good resistance to mechanical wear, with simultaneous elasticity. As a disadvantage, the mixtures described therein are not suitable for coating transparent substrates, such as plastic or glass, if these substrates are exposed to extreme mechanical stresses. For these materials, the wear resistance requirements are, of course, particularly high, since even the slightest damage impairs at least the visual impression. It was, therefore, desirable to improve the surface hardness of sol-gel coatings, in particular those based on the above-mentioned polyfunctional organosilanes, in order to be able to employ them in the coating of preferably transparent substrates.

The object of the present invention was, therefore, to provide mixtures based on monomeric polyfunctional organosilanes from which it is possible to produce coatings and for which the resistance to mechanical wear is significantly improved compared with the known systems and which are suitable for coating transparent substrates.

Surprisingly, it has now been found that the object can be achieved with the mixtures according to the invention of monomeric polyfunctional organosilanes and certain boron- and/or aluminum-containing compounds.

SUMMARY OF THE INVENTION

The present invention, therefore, relates to mixtures comprising
(A) at least one linear, branched, or cyclic monomeric organosilane having at least two silicon atoms with hydrolyzable and/or condensation-crosslinking groups, wherein the silicon atoms are bonded to one another through at least one carbon atom in a linking unit, and
(B) at least one boron- and/or aluminum-containing compound having the formula (I)

$$R_xM(OR')_{3-x} \quad (I)$$

wherein
M is Al or B,
x is 0, 1, or 2,
R is $C_1$–$C_6$-alkyl, $C_6$–$C_{12}$-aryl, or $(O)_{1/2}$, with the proviso that if R is $(O)_{1/2}$, then the compound of the formula (I) is a chain when x is 1 and a cyclic or cage-form compound when x is 2, and
each R' is independently H, $C_1$–$C_{10}$-alkyl, or $C_6$–$C_{12}$-aryl.
The invention further relates to hybrid materials prepared from such mixtures and to coatings produced therefrom.

DETAILED DESCRIPTION OF THE INVENTION

Preferably, the organosilanes (A) contain at least 3, and particularly preferably at least 4, silicon atoms with hydrolyzable and/or condensation-crosslinking groups.

Preferred hydrolyzable groups are $C_1$–$C_{10}$-alkoxy or $C_6$–$C_{12}$-aryloxy groups, particularly alkyloxy groups such as methyloxy, ethyloxy, propyloxy, or butyloxy. Condensation-crosslinking groups are preferably silanol groups (i.e., SiOH).

Linking units in the context of the invention are both individual atoms and molecular units. Molecular units are preferably linear or branched $C_1$–$C_{20}$-alkylene chains, $C_5$–$C_{10}$-cycloalkylene radicals, or $C_6$–$C_{12}$-aromatic radicals such as phenyl, naphthyl, or biphenyl radicals, as well as heterocyclic or heteroaromatic groups or linear groups substituted by heteroatoms. The radicals mentioned above can be mono- or poly-substituted. Preferred single-atom linking units are Si, N, P, O, or S.

Linking units which may be mentioned in particular are cyclic and cage-form siloxanes and branched carbosilanes, the preferred monomeric organosilanes (A) being the following compounds of formula (II):

$$R^1_{4-i}Si[(CH_2)_nSi(OR^2)_aR^3_{3-a}]_i \quad (II)$$

where
i is 2 to 4 (preferably 4),
n is 1 to 10 (preferably 2 to 4, particularly preferably 2),
$R^1$ is $C_1$–$C_6$-alkyl or $C_6$–$C_{14}$-aryl,
$R^2$ is $C_1$–$C_6$-alkyl or $C_6$–$C_{14}$-aryl (preferably methyl, ethyl, or isopropyl),
$R^3$ is $C_1$–$C_6$-alkyl or $C_6$–$C_{14}$-aryl (preferably methyl), and
a is 1 to 3,
with the proviso that when a is 1, then $R^2$ can also denote hydrogen.

Further examples are cyclic compounds of the general formula (III)

wherein
m is 3 to 6 (preferably 3 or 4),
o is 2 to 10 (preferably 2),
c is 1 to 3,
$R^4$ is $C_1$–$C_6$-alkyl or $C_6$–$C_{14}$-aryl (preferably methyl, ethyl, or isopropyl), with the proviso that when c is 1, then $R^4$ can also denote hydrogen, $R^5$ is $C_1$–$C_6$-alkyl or $C_6$–$C_{14}$-aryl (preferably methyl),
$R^6$ is $C_1$–$C_6$-alkyl or $C_6$–$C_{14}$-aryl (preferably methyl or ethyl, particularly preferably methyl),
and/or of the general formula (IV)

$$R^{10}{}_{4-i}Si[OSiR^9{}_2(CH_2)_pSi(OR^7)_dR^8{}_{3-d}]_i \quad (IV)$$

wherein
i is 2 to 4 (preferably 4),
$R^{10}$ is $C_1$–$C_6$-alkyl or $C_6$–$C_{14}$-aryl,
p is 1 to 10 (preferably 2 to 4, particularly preferably 2),
$R^8$ is $C_1$–$C_6$-alkyl or $C_6$–$C_{14}$-aryl (preferably methyl),
d is 1 to 3,
$R^7$ is $C_1$–$C_6$-alkyl or $C_6$–$C_{14}$-aryl (preferably methyl, ethyl, or isopropyl), with the proviso that when d is 1, then $R^7$ can also be H, and
$R^9$ is $C_1$–$C_6$-alkyl or $C_6$–$C_{14}$-aryl (preferably methyl).

Specifically, preferred monomeric organosilanes are silanols and alkoxides, such as the following:
$Si[(CH_2)_2Si(OH)(CH_3)_2]_4$,
cyclo-$\{OSiMe[(CH_2)_2Si(OH)Me_2]\}_4$,
cyclo-$\{OSiMe[(CH_2)_2Si(OEt)_2Me]\}_4$,
cyclo-$\{OSiMe[(CH_2)_2Si(OMe)Me_2]\}_4$, and/or
cyclo-$\{OSiMe[(CH_2)_2Si(OEt)_3]\}_4$,
where Me represents methyl and Et represents ethyl.

Preferred boron- and/or aluminum-containing compounds are those of the general formula (V)

$$R_xM(OR')_{3-x} \quad (V)$$

wherein
M is Al or B,
x is 0 or 1,
R is $C_1$–$C_6$-alkyl or $C_6$–$C_{12}$-aryl, and
each R' is independently H, $C_1$–$C_6$-alkyl, or $C_6$–$C_{12}$ aryl.

Particularly preferred boron-containing compounds are those of formula (V) in which R' is a $C_1$–$C_5$-alkyl radical (especially preferably methyl or ethyl). Particularly preferred aluminum-containing compounds are those of formula (V) in which R' is a $C_1$–$C_5$-alkyl radical (most preferably an isopropyl or 2-butyl radical).

Boron-containing compounds that may be mentioned specifically include the following:
$B(OMe)_3$,
$B(OEt)_3$,
$B(OH)_3$, in which R is methyl or ethyl,
$(RO)_2B$—O—$B(OR)_2$ in which R is methyl or ethyl, and/or
$C_6H_5$—$B(OH)_2$.

Aluminum compounds that may be specifically mentioned include the following:
$Al(O^iPr)_3$
$Al(O^sBu)_3$
where $^iPr$ represents isopropyl and $^sBu$ represent sec-butyl.

In another preferred embodiment of the invention, the mixtures additionally comprise alkoxides (C) of the formula $$Q(OR'')_z \quad (VIa),$$

wherein
Q denotes Ga or In,
z is 3, and
R'' is an optionally mono- or polysubstituted $C_1$–$C_6$-alkyl or $C_6$–$C_{12}$-aryl radical,
and/or wherein
M denotes Si, Ge, Ti, Zr, or Hf,
z is 4, and
R'' has the above meaning,
and/or compounds of the formula $$(R')_{4-y}Si(OR'')_y \quad (VIb)$$

wherein
R' is a $C_1$–$C_6$-alkyl or $C_6$–$C_{14}$-aryl radical that is optionally mono- or polysubstituted,
y is 1, 2, or 3, and
R'' has the same meaning as in formula (VIa).

Alkoxides of the following formulas are particularly preferred:
$Si(OCH_3)_4$,
$Si(OC_2H_5)_4$,
$CH_3$—$Si(OCH_3)_3$,
$CH_3$—$Si(OC_2H_5)_3$,
$C_6H_5$—$Si(OCH_3)_3$,
$C_6H_5$—$Si(OC_2H_5)_3$.

The alkoxides increase the wear resistance.

To further increase the wear resistance, the mixtures according to the invention can also comprise inorganic particles (D). Inorganic particles (D) that are employed in particular are those in which the particle size is so small that optically transparent hybrid materials are obtained from the mixtures according to the invention. Such particles are, for example, oxides, oxide hydrates, and/or hydroxides of the elements B, Al, Si, Ti, Zr, and Ce, such as $B_2O_3$, $Al_2O_3$, $SiO_2$, $TiO_2$, and $CeO_2$. Silica sols as an aqueous or organic dispersion are preferably suitable for mechanical strengthening. The average particle size is preferably 1 to 100 nm (preferably 5 to 50 nm) as determined by ultracentrifugation.

In another preferred embodiment of the invention, the mixtures additionally comprise a solvent (E). Suitable solvents (E) are, for example, mono- and polyfunctional alcohols, such as methanol, ethanol, n-propanol, isopropanol, n-butanol, sec-butanol, 1-methoxy-2-propanol, and ethylene glycol; ketones, such as acetone, methyl ethyl ketone, and methyl isobutyl ketone; and esters, such as n-butyl acetate. However, it is also entirely possible to employ mixtures of various solvents.

If the solvents (E) used are appropriately matched, it is also possible additionally to add organic polymers to the mixtures according to the invention. This can serve, for example, to improve the elasticity of the coatings produced from the mixtures. However, the adhesion of a coating, in particular to plastics, can also be improved by addition of organic polymers.

Organic polymers that may be mentioned as preferred are those based on poly(meth)acrylates, polyesters, polyamides, polyketones, or polycarbamates.

It is, of course, also possible to add to the mixtures according to the invention soluble dyestuffs or organic and inorganic pigments for coloring or as anticorrosive agents, as well as other paint auxiliaries, such as flow control auxiliaries.

The mixtures according to the invention preferably have the following composition:

| | |
|---|---|
| 10 to 80 wt. % | of at least one monomeric organosilane (A), |
| 0.1 to 20 wt. % | of at least one boron- and/or aluminum-containing compound (B), |
| 0 to 50 wt. % | of alkoxides (C), |
| 0 to 80 wt. % | of inorganic particles (D), and |
| 0 to 50 wt. % | of solvent (E), | the sum of all the components present being 100 wt. %.

Particularly preferred aluminum-containing mixtures are those having the following composition:

| | |
|---|---|
| 5 to 15 wt. % | of at least one monomeric organosilane (A), |
| 8 to 16 wt. % | of at least one aluminum-containing compound (B), |
| 25 to 40 wt. % | of alkoxides (C), and |
| 20 to 45 wt. % | of solvent (E), | the sum of all the components present being 100 wt. %.

Most preferred aluminum-containing mixtures are those having the following composition:

| | |
|---|---|
| 8 to 11 wt. % | of at least one monomeric organosilane (A), |
| 10 to 14 wt. % | of at least one aluminum-containing compound (B), |
| 30 to 40 wt. % | of alkoxides (C), and |
| 35 to 45 wt. % | of solvent (E), | the sum of all the components present being 100 wt. %.

The mixtures according to the invention are preferably prepared by mixing the components in any desired sequence, with stirring if appropriate.

The invention also provides hybrid materials obtained by reaction of a mixture according to the invention in the presence of water and, if appropriate, catalysts and/or complex-forming compounds.

Examples of catalysts that may be mentioned include organic and inorganic acids and bases, such as formic acid, p-toluenesulfonic acid, hydrochloric acid, and sodium and potassium hydroxide, organometallic catalysts, such as dibutyltin laurate, and catalytically active alkoxides, such as alkoxides of Ti and Al.

The catalysts are preferably employed in an amount of less than 1 wt. %, based on all the constituents of the mixture.

An example of a complex-forming compound, which reduces the reactivity of aluminum alkoxides toward water, is ethyl acetoacetate.

The amount of water is preferably sufficiently large that all the hydrolyzable groups of the mixture can react. The molar ratio of hydrolyzable groups to water is particularly preferably between 1:1 and 1:2.

In one embodiment of the present invention for the preparation of boron-containing mixtures, the boron-containing compound (B) is first mixed with a dispersion of the inorganic particles (D) (such as $SiO_2$) in an organic solvent (organic silica sol). If appropriate, condensation of (B) with the $SiO_2$ particles may occur here. The other components, that is, monomeric organosilane (A) and, if appropriate, solvent (E), alkoxide (D), water and catalyst, are then added to this modified silica sol.

In a further embodiment the aluminum compound (B) is first dissolved in the solvent and complexed with a complexing agent, such as, for example, ethyl acetoacetate, at room temperature. At the same time, the alkoxide (C) is dissolved in the solvent (E) and a catalyst, such as, for example, 0.1 N p-toluenesulfonic acid is added and stirring is carried out for one hour at room temperature ("prehydrolyzate"). The prehydrolyzate is then mixed with the complexed aluminum solution and an additional amount of catalyst, such as 0.1 N p-toluenesulfonic acid, is optionally added, and the solution is stirred for about one hour. Finally, monomeric organosilane (A) and solvent (E) are added and the reaction mixture is stirred for a further hour at room temperature. The coating is then ready for use and can be applied.

In addition, it is possible in a further embodiment of the present invention for the production of aluminum-containing mixtures to initially dissolve the aluminum compound (B) in the solvent (E) and to carry out complexing with a complexing agent, such as, for example, ethyl acetoacetate, at room temperature, and then to heat the complexed solution to 40 to 80° C. and finally to add monomeric organosilane (A) with constant stirring at molar ratios of monomeric organosilane to aluminum compound of 1:16 to 1:4.5 ("aluminum/organosilane precursor"). At the same time, the alkoxide is dissolved in the solvent and a catalyst, such as, for example, 0.1 N p-toluenesulfonic acid, is added and the mixture is stirred for one hour at room temperature ("prehydrolyzate"). The prehyrolyzate is then mixed with the aluminum/organosilane precursor and an additional amount of catalyst, such as 0.1 N p-toluenesulfonic acid, is optionally added to the solution and the reaction mixture is stirred for one hour. The coating is then ready for use and can be applied.

The volatile constituents can then be evaporated off at temperatures between −30° C. and 220° C.

The invention also provides coatings obtainable by applying the mixtures or hybrid materials according to the invention to a surface and evaporating the volatile components that are present or are formed during the coating process. This process can be carried out, for example, at temperatures of −30° C. to 220° C., preferably under normal pressure. If necessary, the resulting coating can be after-cured at the stated temperatures.

The mixtures according to the invention are particularly suitable for the production of hybrid materials or coatings of high transparency, excellent resistance to solvents and chemicals, heat stability, and resistance to mechanical wear. The fact that many of the mixtures mentioned can be cured at room temperature to give wear-resistant coatings is also to be emphasized.

On the basis of the above-mentioned profile of properties, the mixtures according to the invention are suitable above all for coating plastics for the purpose of improving the ability of the surface to withstand mechanical wear. In particular, the surface of transparent plastics, such as of polycarbonates and poly(methyl)acrylates, can be well protected against mechanical wear using the new coatings.

It is known that the adhesion of scratch-resistant coating to plastics can be improved considerably by means of pre-coating (priming) or physical treatment (plasma or corona treatment). These kinds of treatment are also possible here. However, primed metallic substrates can also be protected, for example, against mechanical stress and the influence of chemicals, in the same manner. A transparent top coating with the mixtures or hybrid material according to the invention effectively protects organic coatings, for example, based on polyurethanes or epoxides, against the penetration of paint and can, therefore, be employed as an anti-graffiti coating. However, such protection can also be achieved for ceramic and mineral substrates (for example, natural stone).

Metallic surfaces, for example, of iron, steel, copper, aluminum, bronze, or brass, can also be protected, for example, against mechanical wear, with the coatings according to the invention. This is of importance in the case of steel in particular if the surface has a particular structure (for example, brushed steel).

Appropriately coated glass can be protected, for example, against environmental influences, such as acid rain.

Due to their destructive action on (micro)organisms, the mixtures according to the invention can be used particularly where growth or adhesion of organisms is to be avoided. This is of particular importance in the case of naturally occurring substances, such as wood. Use as an anti-fouling coating is also possible.

The following examples further illustrate details for the preparation and use of the compositions of this invention. The invention, which is set forth in the foregoing disclosure, is not to be limited either in spirit or scope by these examples. Those skilled in the art will readily understand that known variations of the conditions and processes of the following preparative procedures can be used to prepare these compositions. Unless otherwise noted, all temperatures are degrees Celsius and all percentages are percentages by weight.

EXAMPLES

Introduction

Cyclo-$\{SiO(CH_3)[(CH_2)_2Si(OH)(CH_3)_2]\}_4$ (referred to in the following as D4-silanol) and cyclo-$\{SiO(CH_3)[(CH_2)_2Si(OEt)_2(CH_3)]\}_4$ (referred to in the following as D4-diethoxide) were prepared as described in PCT Patent Application WO 98/38251. The organic silica sol employed was a dispersion of 30.4 wt. % $SiO_2$ (primary particle diameter approx. 9 nm, average particle diameter $d_{50}$ less than 20 nm) in isopropanol with a residual water content of less than 1 wt. %. All of the other (commercially obtainable) starting substances were employed without further purification.

The coatings were applied to glass plates or polycarbonate plates (Makrolon® polycarbonate, Bayer AG, Leverkusen, Germany) by spin-coating at various speeds or rotations (300 to 2000 rpm) and for various spinning times (5 to 30 seconds) by means of a film-casting frame with different gap widths (30, 60, 90, 120, and 240 μm). After evaporation of the volatile constituents at room temperature, the coatings were cured in a circulating air cabinet.

The pendulum hardness was determined in accordance with DIN 53,157 (the mean of 3 measurements is stated).

Abrasion resistance is determined using the Tabor Abraser Method according to ISO 3537 (500 g per wheel using CS10F wheels). After 1000 cycles the increase in optical haze (ΔH) was measured as a criterion of the abrasion resistance according to ASTM D 1003.

In addition, wear resistance was determined by the so-called stroke-thrust test (20 strokes) was carried out, and the increase in the optical clouding (Δ clouding) was observed. The test was carried out and the clouding was determined in the following manner:

Description of the Scratching Method

A disk to be scratched measuring 100×100 mm was placed in a recess of equal size and exactly equal thickness in the base of a plastic shell. The plastic shell was attached to a carriage, which performed backwards and forwards movements, using a motor, of 100 mm stroke length at a stroke frequency of 150 strokes/min. The scratching medium was poured onto the inserted disk and the disk was scratched with a stroke count pre-selected on the stroke counter. At the stroke speed, the scratching medium remained almost at rest due to its inertia, meaning that the relative movement between the scratching medium and disk was high. The suitable amount of scratching medium employed for the shell size used was 1 kg. Broken quartz sand with a fraction of 1.5 to 2.5 mm particle size was used as the scratching medium.

Measurement of the Degree of Scratching of the Samples

For these transparent samples, the degree of scratching was determined by measuring the increase in clouding as a function of the stroke count.

A general description of the test method is to be found in *Farbe und Lack*, 78(8), 712–723 (1972).

Example 1

Preparation of Boron-modified Organosols 50 g of organic silica sol and the type and amount of boron compound stated in table 1 were brought together, while stirring, and the mixture was stirred for a further 20 hours. The clouding of the resulting products was minimally higher than that of the organosol employed.

TABLE 1

| Sample no. | Boron-containing compound | Amount [g] |
|---|---|---|
| 1a | $B(OEt)_3$ | 1.5 |
| 1b | $B(OEt)_3$ | 5.0 |
| 1c | $B(OMe)_3$ | 1.5 |
| 1d | $B(OMe)_3$ | 5.0 |
| 1e | Trimethoxyboroxine | 5.0 |
| 1f | Phenyboronic acid | 0.5 |

Example 2

Coatings with the Boron-modified Organosol 1a and D4-silanol

The components were mixed in the amount and sequence as stated in table 2, while stirring, and the mixture was stirred for a further 60 minutes. Thereafter, two films (30 and 60 μm wet film thickness) were applied to glass and were cured for 30 minutes at room temperature and for 3 hours at 130° C. Crack-free, transparent coatings were obtained.

TABLE 2

| Component | Sample 2a Amount [g] | Sample 2b Amount [g] | Sample 2c Amount [g] | Sample 2d Amount [g] |
|---|---|---|---|---|
| D4-Silanol | 0.9 | 0.8 | 0.6 | 0.5 |
| TEOS | 1.6 | 1.6 | 1.6 | 1.6 |
| Modified Organosol 1a | 5.0 | 5.0 | 5.0 | 5.0 |
| Isopropanol | 3.9 | 3.9 | 3.9 | 3.9 |
| 0.1 N p-toluene-sulfonic acid | 0.3 | 0.3 | 0.3 | 0.3 |

Example 3

Coatings with the Boron-modified Organosol 1b and D4-silanol

The components were mixed in the amount and sequence as stated in table 3, while stirring, and the mixture was stirred for a further 60 minutes. Thereafter, two films (30 and 60 μm wet film thickness) were applied to glass and were cured for 30 minutes at room temperature and for 3 hours at 130° C. Crack-free, transparent coatings were obtained.

TABLE 3

| Component | Sample 3a Amount [g] | Sample 3b Amount [g] | Sample 3c Amount [g] | Sample 3d Amount [g] |
|---|---|---|---|---|
| D4-silanol | 0.9 | 0.8 | 0.6 | 0.5 |
| TEOS | 1.6 | 1.6 | 1.6 | 1.6 |
| Modified Organosol 1b | 5.0 | 5.0 | 5.0 | 5.0 |
| Isopropanol | 3.9 | 3.9 | 3.9 | 3.9 |
| 0.1 N p-Toluene-sulfonic acid | 0.3 | 0.3 | 0.3 | 0.3 |

Figure 1:
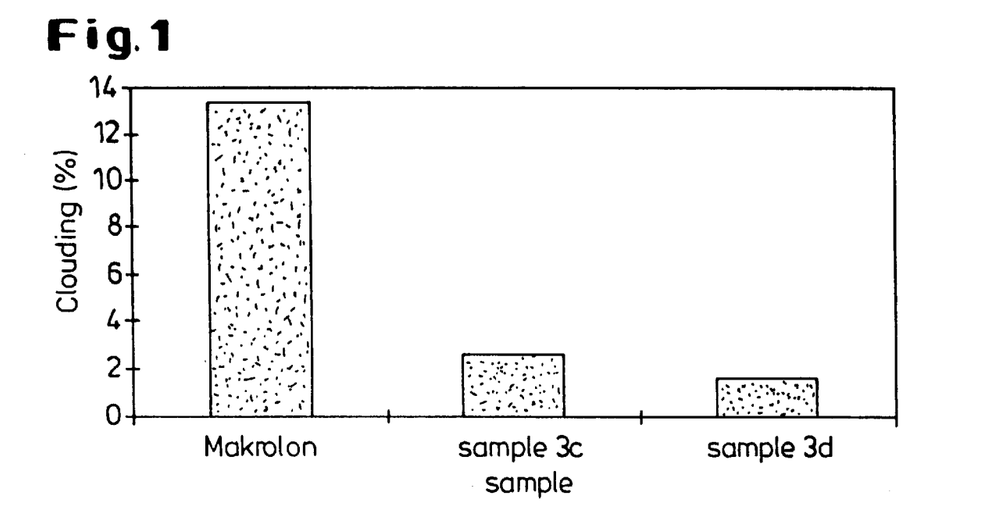
FIGS. 1, 2, and 4 are graphical representations of the results of stroke-thrust tests for Examples 3 and 5 and Comparison Example 3, respectively.

The results of the stroke-thrust test are shown in the following table and plotted as a graph in FIG. 1. The value for non-coated polycarbonate (Makrolon®, Bayer AG, D-51368 Leverkusen, Germany) is also shown for comparison.

| Sample no. | Δ clouding [%] |
|---|---|
| Makrolon ® | 13.40 |
| 3c | 2.60 |
| 3d | 1.59 |

Example 4

Coatings with the Boron-modified Organosol 1a and D4-diethoxide

The components were mixed in the amount and sequence as stated in table 4, while stirring, and the mixture was stirred for a further 60 minutes. Thereafter, two films (30 and 60 μm wet film thickness) were applied to glass and were cured for 30 minutes at room temperature and for 3 hours at 130° C. Crack-free, transparent coatings were obtained.

TABLE 4

| Component | Sample 4a Amount [g] | Sample 4b Amount [g] | Sample 4c Amount [g] |
|---|---|---|---|
| D4-diethoxide | 0.9 | 0.8 | 0.6 |
| TEOS | 1.6 | 1.6 | 1.6 |
| Modified Organosol 1a | 5.0 | 5.0 | 5.0 |
| Isopropanol | 3.9 | 3.9 | 3.9 |
| 0.1 N p-Toluene-sulfonic acid | 0.4 | 0.4 | 0.4 |

Example 5

Coatings with the Boron-modified Organosol 1b and D4-diethoxide

The components were mixed in the amount and sequence as stated in table 5, while stirring, and the mixture was stirred for a further 60 minutes. Thereafter, two films (30 and 60 μm wet film thickness) were applied to glass and were cured for 30 minutes at room temperature and for 3 hours at 130° C. Crack-free, transparent coatings were obtained.

TABLE 5

| Component | Sample 5a Amount [g] | Sample 5b Amount [g] |
|---|---|---|
| D4-diethoxide | 0.9 | 0.8 |
| TEOS | 1.6 | 1.6 |
| Modified Organosol 1b | 5.0 | 5.0 |
| Isopropanol | 3.9 | 3.9 |
| 0.1 N p-Toluene-sulfonic acid | 0.4 | 0.4 |

Figure 2:
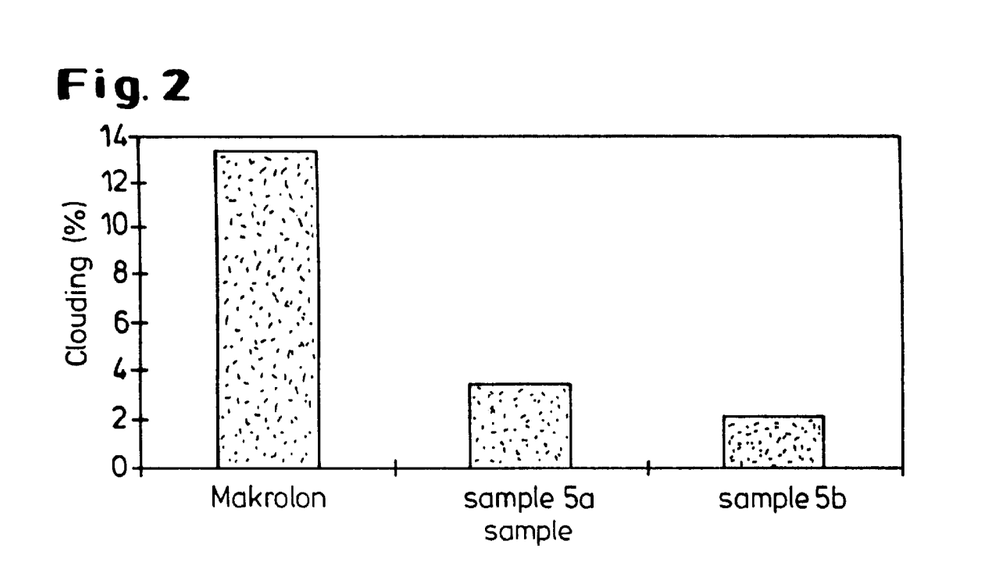

The results of the stroke-thrust test are shown in table 5a, also in comparison with non-coated Makrolon®, and plotted in FIG. 2.

TABLE 5a

| Sample no. | Δ clouding [%] |
|---|---|
| Makrolon ® | 13.40 |
| 5a | 3.44 |
| 5b | 2.13 |

Example 6

Coatings with the Boron-modified Organosol 1c and D4-silanol

The components were mixed in the amount and sequence as stated in table 6, while stirring, and the mixture was stirred for a further 60 minutes. Thereafter, films (60 and 90 μm wet film thickness) were applied to glass and were cured for 30 minutes at room temperature and for 3 hours at 130° C. Transparent, crack-free films which showed a very good wear resistance with respect to steel wool were obtained.

TABLE 6

| Component | Sample 6 Amount [g] |
|---|---|
| D4-silanol | 0.6 |
| TEOS | 1.6 |
| Modified Organosol 1c | 5.0 |
| Isopropanol | 3.9 |
| 0.1 N p-Toluene-sulfonic acid | 0.3 |

Example 7

Coatings with the Boron-modified Organosol 1d and D4-silanol

The components were mixed in the amount and sequence as stated in table 7, while stirring, and the mixture was stirred for a further 60 minutes. Thereafter, films (60 and 90 μm wet film thickness) were applied to glass and were cured for 30 minutes at room temperature and for 3 hours at 130° C. Transparent, crack-free films were obtained.

TABLE 7

| Component | Sample 7a Amount [g] | Sample 7b Amount [g] |
|---|---|---|
| D4-silanol | 0.6 | 0.5 |
| TEOS | 1.6 | 1.6 |

TABLE 7-continued

| Component | Sample 7a Amount [g] | Sample 7b Amount [g] |
|---|---|---|
| Modified Organosol 1d | 5.0 | 5.0 |
| Isopropanol | 3.9 | 3.9 |
| 0.1 N p-Toluene-sulfonic acid | 0.3 | 0.3 |

The results of the stroke-thrust test are shown in the following table.

| Sample no. | Δ clouding [%] |
|---|---|
| Makrolon ® | 13.40 |
| 7b | 1.44 |

Example 8

Coatings with the Boron-modified Organosol 1e and D4-silanol

The components were mixed in the amount and sequence as stated in table 8, while stirring, and the mixture was stirred for a further 60 minutes. Thereafter, films (60 and 90 μm wet film thickness) were applied to glass and were cured for 30 minutes at room temperature and for 3 hours at 130° C. Transparent, crack-free films which showed a very good wear resistance with respect to steel wool were obtained.

TABLE 8

| Component | Sample 8 Amount [g] |
|---|---|
| D4-silanol | 0.5 |
| TEOS | 1.6 |
| Modified Organosol 1c | 5.0 |
| Isopropanol | 3.9 |
| 0.1 N p-Toluene-sulfonic acid | 0.3 |

Example 9

Coatings with the Boron-modified Organosol 1f and D4-silanol

The components were mixed in the amount and sequence as stated in table 9, while stirring, and the mixture was stirred for a further 60 minutes. Thereafter, films (60 and 90 μm wet film thickness) were applied to glass and were cured for 30 minutes at room temperature and for 3 hours at 130° C. Transparent, crack-free films were obtained.

TABLE 9

| Component | Sample 9 Amount [g] |
|---|---|
| D4-silanol | 0.5 |
| TEOS | 1.6 |
| Modified Organosol 1c | 5.0 |
| Isopropanol | 3.9 |

TABLE 9-continued

| Component | Sample 9 Amount [g] |
|---|---|
| 0.1 N p-Toluene-sulfonic acid | 0.3 |

Example 10

Addition of Organic Polymer to Improve the Adhesion 0.6 ml of Desmophen® A 450, 50 wt. % in n-butyl acetate, was added to 4 ml of a mixture prepared according to Example 7, sample 7b, after the stated stirring of 60 min. A transparent, homogeneous mixture was obtained. After stirring for a further 15 min, a film (60 μm wet film thickness) was applied to Makrolon® and was cured for 30 minutes at room temperature and for 3 hours at 130° C.

An adhesive strip then applied to the coating obtained left the coating unchanged after being peeled off.

(Desmophen® 450 is a polyacrylate-based polymer with a viscosity of 4,000 mPa·s at 23° C. and an OH content of 1.0%, manufactured by Bayer AG, Leverkusen.)

Comparison Example 1

Preparation of Si(OMe)$_4$-modified Organosols 50 g of organic silica sol and the type and amount of an alkoxide stated in the following table were brought together, while stirring, and the mixture was stirred for a further 20 hours.

| Sample no. | Alkoxide | Amount [g] |
|---|---|---|
| V1 | Si(OMe)$_4$ | 1.5 |

Comparison Example 2

Coatings with Pure Organosol and Si(OMe)$_4$-modified Organosol V1

The components were mixed in the amount and sequence as stated in table 10, while stirring, and the mixture was stirred for a further 60 minutes. Thereafter, two films (120 and 240 μm wet film thickness) were applied to glass and were cured for 30 minutes at room temperature and for 1 and 4 hours at 130° C. Crack-free, transparent coatings were obtained.

TABLE 10

| Components | Sample V2a Amount [g] | Sample V2b Amount [g] |
|---|---|---|
| D4-silanol | 2.5 | 2.5 |
| TEOS | 1.6 | 1.6 |
| Organosol | x | 5.0 |
| Modified Organosol V1 | 5.0 | x |
| Isopropanol | 3.9 | 3.9 |
| 0.1 N p-Toluene-sulfonic acid | 0.3 | 0.3 |

Figure 3:
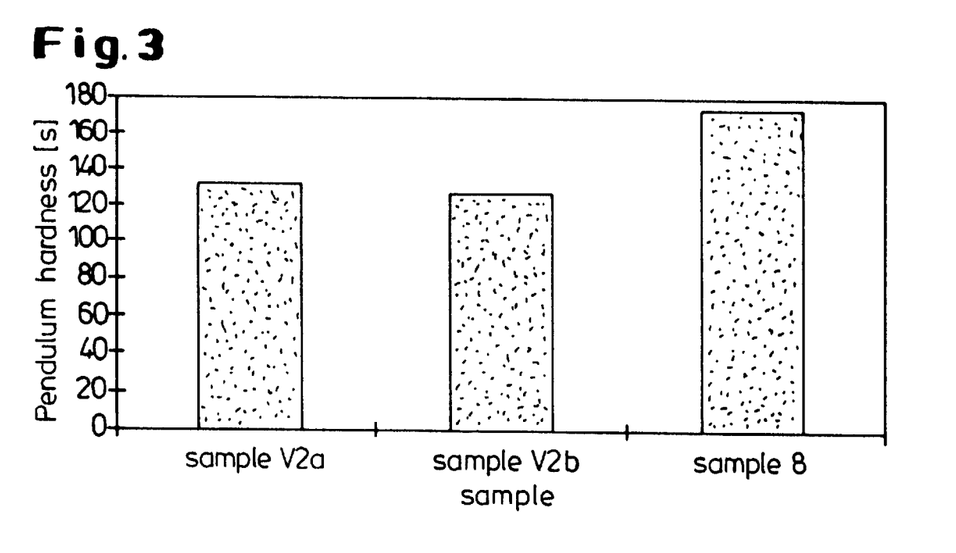
FIG. 3 is a graphical representation of relative pendulum hardnesses for samples described in Comparison Example 2.

Table 11 shows that the boron-containing coating has a considerably higher pendulum hardness that the comparable coating based on the modified organosol V1. This relationship is illustrated in FIG. 3.

TABLE 11

| Sample no. | Curing 1 h Pendulum hardness [s] | Curing 4 h Pendulum hardness [s] |
|---|---|---|
| 8 | 158 | 174 |
| V2a | 105 | 132 |
| V2b | not determined | 127 |

Comparison Example 3

The components were mixed in the amount and sequence as stated in table 12, while stirring, and the mixture was stirred for a further 60 minutes. Thereafter, a film (60 μm wet film thickness) was applied to glass and was cured for 30 minutes at room temperature and for 3 hours at 130° C.

TABLE 12

| Component | Sample V3 Amount [g] |
|---|---|
| D4-silanol | 0.6 |
| TEOS | 1.6 |
| Organosol | 5.0 |
| Isopropanol | 3.9 |
| 0.1 N p-Toluene-sulfonic acid | 0.3 |

Figure 4:
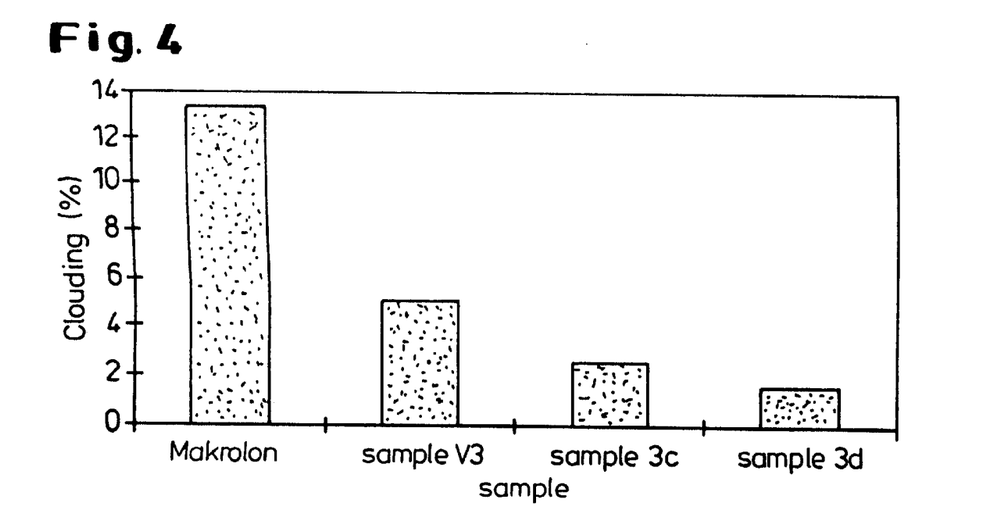

The results of the stroke-thrust test are shown in table 13. The value for non-coated substrate is also given there for comparison. The results of the stroke-thrust test are also shown as a graph in FIG. 4. It is clear that the wear resistance can be increased considerably even by addition of small amounts of boric acid ester.

TABLE 13

| Sample no. | Δ clouding [%] |
|---|---|
| Makrolon ® | 13.4 |
| V3 | 5.15 |
| 3c | 2.60 |
| 3d | 1.59 |

Example 11

Production of and Coating with Aluminum-containing Hybrid Materials (Soft Coating)

10 g of TEOS were dissolved in 4 g of 2-methoxy-2-propanol and mixed with stirring with 2 g of 0.1 N p-toluenesulphonic acid, and stirring was continued for a further 60 minutes (prehydrolyzate). 3 g of aluminum sec-butylate were dissolved in 2.4 g of 1-methoxy-2-propanol, 1.6 g of ethyl acetoacetate were added, and the mixture was added to the prehydrolyzate, and stirring was continued for a further 60 minutes. 4.1 g of D4-silanol dissolved in 7.6 g of 1-methoxy-2-propanol were added to the solution and stirring was continued for a further hour.

The coating composition was then applied to polycarbonate plates (Makrolon®, 100×100 mm) pretreated with 3-aminopropyltrimethoxy-silane by spin application (2000 rpm, 20 s, curing at 80° C. for 1 hour) and the coating was cured for 5 hours at 130° C. The results of the Taber Abraser test compared with non-coated polycarbonate are summarized in Table 15 and shown graphically in FIG. 5 (see Example 13 for the definitions of the symbols used in FIG. 5).

TABLE 14

| Name. | Δ Haze [in %] |
|---|---|
| Makrolon ® | 54.0 |
| Example 11 | 22.0 |

Example 12

Production of and Coating with Aluminum-containing Hybrid Materials (Moderately Hard Coating)

10 g of TEOS were dissolved in 7.6 g of 1-methoxy-2-propanol and mixed with stirring with 2 g of 0.1 N p-toluenesulphonic acid, and the mixture was stirred for a further 60 minutes (prehydrolyzate). 3 g of aluminum sec-butylate were dissolved in 1.5 g of 1-methoxy-2-propanol, 1.6 of ethyl acetoacetate were added and the mixture was added to the prehydrolyzate and stirring was continued for a further 60 minutes. 4.1 g of D4-silanol dissolved in 7.6 g of 1-methoxy-2-propanol were added to the solution and stirring was continued for a further hour.

The coating composition was then applied to polycarbonate plates (Makrolon®, 100×100 mm) pretreated with 3-aminopropyltrimethoxy-silane by spin application (2000 rpm, 20 s, curing at 80° C. for 1 hour) and the coating was cured at 130° C. for 5 hours. The results of the Taber Abraser test compared with non-coated polycarbonate are summarized in Table 15 and depicted graphically in FIG. 5 (see Example for the definitions of the symbols used in FIG. 5).

TABLE 15

| Name | Δ Haze [in %] |
|---|---|
| Makrolon ® | 54.0 |
| Example 12 | 17.3 |

Example 13

Production of and Coating with Aluminum-containing Hybrid Materials (Hard Coating)

10 g of TEOS were dissolved in 5.5 g of 1-methoxy-2-propanol and mixed with stirring with 2 g of 0.1 N p-toluenesulphonic acid, and the mixture was stirred for a further 60 minutes (prehydrolyzate). 3 g of aluminum sec-butylate were dissolved in 1 g of 1-methoxy-2-propanol, 1.6 g of ethyl acetoacetate were added, and the mixture was added to the prehydrolyzate, and stirring was continued for a further 60 minutes. 1.7 g of D4-silanol dissolved in 4.1 g of 1-methoxy-2-propanol were added to the solution and stirring was continued for a further hour.

The coating composition was then applied to polycarbonate plates (Makrolon®, 100×100 mm) pretreated with 3-aminopropyltrimethoxy-silane by spin application (2000 rpm 20 s, curing for one hour at 80° C.) and the coating was cured for 5 hours at 130° C.

Figure 5:
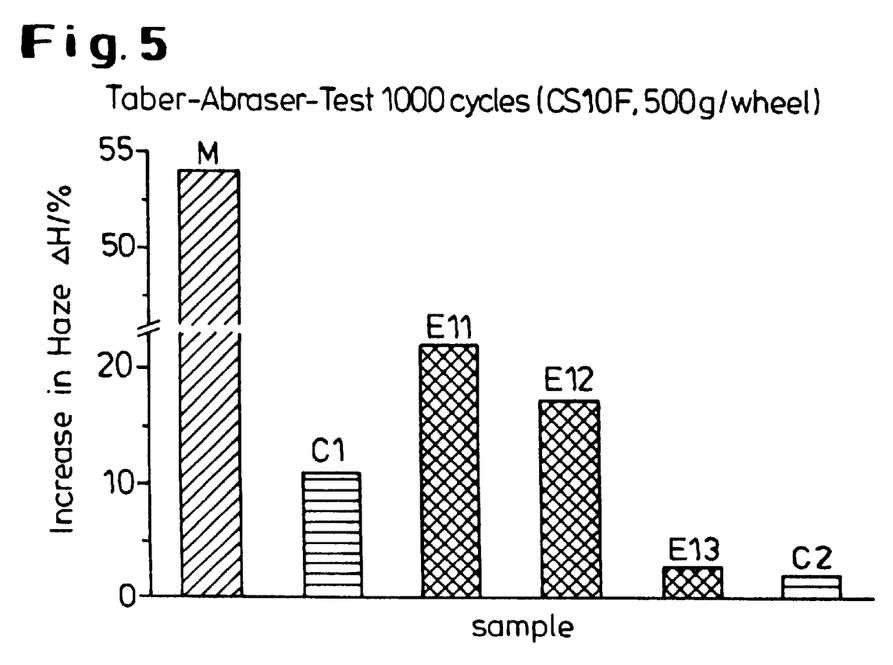
FIG. 5 is a graphical representation of abrasion resistances for samples described in Examples 11 to 13.

The results of the Taber Abraser test compared with non-coated polycarbonate and glass are summarized in Table 16 and depicted graphically in FIG. 5.

TABLE 16

| Name | Δ Haze [in %] |
| --- | --- |
| Makrolon ® | 54.0 |
| Example 12 | 17.3 |
| Glass | 2.0 |

In FIG. 5:

M=uncoated polycarbonate (Makrolon®)

C1=comparison sample 1 (coated polycarbonate, MR5®from GE)

C2=comparison sample 2 (non-coated glass)

E11=Example 11

E12=Example 12

E13=Example 13

Example 14

Production of and Coating with Aluminum-coating Hybrid Materials Using an Aluminum/Organosilane Precursor Aluminum/Organosilane Precursor 6.2 g of aluminum sec-butylate were dissolved in 1.2 g 1-methoxy-2-propanol and 3.3 g of ethyl acetoacetate were added, and the mixture was heated to 60° C. 4.1 g of D4-silanol in 7.5 g of 1-methoxy-2-propanol were added with stirring to this solution. After the addition was completed, stirring was continued for a further hour at 60° C.

14.2 g of TEOS were dissolved in 9 g of 1-methoxy-propanol and mixed with 2.9 g of 0.1 N p-toluenesulphonic acid with stirring, and stirring was continued for a further 60 minutes (prehydrolyzate). The aluminum/organosilane precursor and the prehydrolyzate were mixed. 2.9 g of 0.1 N p-toluenesulphonic acid were added with stirring and stirring was continued for a further 60 minutes. The coating composition was then applied to polycarbonate plates (Makrolon®. 100×100 mm) pretreated with 3-aminopropyltrimethoxysilane by spin application (2000 rpm, 20 s, curing at 80° C. for 1 hour) and the coating was cured for 5 hours at 130° C.

What is claimed is:

1. A mixture comprising (A) at least one linear, branched, or cyclic monomeric organosilane comprising:

at least two silicon atoms bonded to hydrolyzable and/or condensation-crosslinking groups and to at least one carbon atom, wherein the silicon atoms are each attached to a common linking unit via at least one carbon atom; and (B) at least one boron- and/or aluminum-containing compound having the formula (I)

$$R_xM(OR')_{3-x} \quad (I)$$

wherein

M is Al or B, x is 0, 1, or 2,

R is $C_1$–$C_6$-alkyl, $C_6$–$C_{12}$-aryl, or $(O)_{1/2}$, with the proviso that where R is $(O)_{1/2}$, the compound of the formula (I) is a chain where x is 1 and a cyclic or cage-form compound where x is 2, and each R' is independently H, $C_1$–$C_{10}$-alkyl, or $C_6$–$C_{12}$-aryl.

2. A mixture according to claim 1 wherein the hydrolyzable group is $C_1$–$C_{10}$-alkoxy or $C_6$–$C_{12}$-aryloxy and the condensation-crosslinking group is OH.

3. A mixture according to claim 1 wherein the linking units are linear or branched $C_1$–$C_{20}$-alkylene chains, $C_5$–$C_{10}$-cycloalkylene radicals, or $C_6$–$C_{12}$-aromatic radicals; heterocyclic or heteroaromatic groups; linear groups substituted by heteroatoms; Si, N, P, O, or S; or combinations thereof.

4. A mixture according to claim 1 wherein the linking units are cyclic or cage-form siloxanes or branched carbosilanes.

5. A mixture according to claim 1 wherein the monomeric organosilane is (a) a compound of the formula $$R^1{}_{4-i}Si[(CH_2)_nSi(OR^2)_aR^3{}_{3-a}]_i$$

wherein i is 2 to 4, n is 1 to 10, $R^1$ is $C_1$–$C_6$-alkyl or $C_6$–$C_{14}$-aryl, $R^2$ is $C_1$–$C_6$-alkyl or $C_6$–$C_{14}$-aryl, $R^3$ is $C_1$–$C_6$-alkyl or $C_6$–$C_{14}$-aryl, and a is 1 to 3, with the proviso that where a is 1, $R^2$ can also be hydrogen;

(b) a compound of the formula $$\left[ \begin{array}{c} Si(OR^4)_cR^5{}_{3-c} \\ | \\ (CH_2)_o \\ | \\ -Si-O- \\ | \\ R^5 \end{array} \right]_m$$

wherein m is 3 to 6, o is 2 to 10, c is 1 to 3, $R^4$ is $C_1$–$C_6$-alkyl or $C_6$–$C_{14}$-aryl, with the proviso that where c is 1, $R^4$ can also be hydrogen, $R^5$ is $C_1$–$C_6$-alkyl or $C_6$–$C_{14}$-aryl, $R^6$ is $C_1$–$C_6$-alkyl or $C_6$–$C_{14}$-aryl;

(c) a compound of the formula $$R^{10}{}_{4-i}Si[OSiR^9{}_2(CH_2)_pSi(OR^7)_dR^8{}_{3-d}]_i$$

wherein i is 2 to 4, $R^{10}$ is $C_1$–$C_6$-alkyl or $C_6$–$C_{14}$-aryl, p is 1 to 10, $R^8$ is $C_1$–$C_6$-alkyl or $C_6$–$C_{14}$-aryl, d is 1 to 3, $R^7$ is $C_1$–$C_6$-alkyl or $C_6$–$C_{14}$-aryl, with the proviso that where d is 1, $R^7$ can also be H, and $R^8$ is $C_1$–$C_6$-alkyl or $C_6$–$C_{14}$-aryl; or (d) a combination thereof.

6. A mixture according to claim 1 wherein the monomeric organosilane is $Si[(CH_2)_2Si(OH)(CH_3)_2]_4$, cyclo-$\{OSiMe[(CH_2)_2Si(OH)Me_2]\}_4$, cyclo-$\{OSiMe[(CH_2)_2Si(OEt)_2Me]\}_4$, cyclo-$\{OSiMe[(CH_2)_2Si(OMe)Me_2]\}_4$, and/or cyclo-$\{OSiMe[(CH_2)_2Si(OEt)_3]\}_4$.

7. A mixture according to claim 1 additionally comprising (a) alkoxides (C) of the formula $$Q(OR'')_z$$

wherein
Q denotes Ga or In,
z is 3, and
R" is an optionally mono- or polysubstituted $C_1$–$C_6$-alkyl or $C_6$–$C_{12}$-aryl radical,
and/or wherein
Q denotes Si, Ge, Ti, Zr, or Hf,
z is 4, and
R" is an optionally mono- or polysubstituted $C_1$–$C_6$-alkyl or $C_6$–$C_{12}$-aryl radical; and/or
(b) alkoxides (C) of the formula $$(R')_{4-y}Si(OR'')_y$$

wherein
R' is a $C_1$–$C_6$-alkyl or $C_6$–$C_{14}$-aryl radical that is optionally mono- or polysubstituted,
y is 1, 2, or 3 and
R" is an optionally mono- or polysubstituted $C_1$–$C_6$-alkyl or $C_6$–$C_{12}$-aryl radical.

8. A mixture according to claim 1 additionally comprising inorganic particles (D) and, optionally, solvents (E).

9. A mixture according to claim 1 comprising 10 to 80 wt. % of at least one monomeric organosilane (A), 0.1 to 20 wt. % of at least one boron- and/or aluminum-containing compound (B), 0 to 50 wt. % of alkoxides (C), 0 to 80 wt. % of inorganic particles (D), and 0 to 50 wt. % of solvent (E), the sum of all the components present being 100 wt. %.

10. A hybrid material obtained by a process comprising reacting a mixture according to claim 1 in the presence of water and, optionally, a catalyst.

11. A coating obtained by a process comprising applying a hybrid material according to claim 10 to a surface and evaporating any volatile components.

* * * * *